United States Patent [19]
Gerber

[11] 3,918,167
[45] Nov. 11, 1975

[54] APPARATUS FOR SENSING RELATIVE MOVEMENT OF A WORK TABLE AND TOOL

[75] Inventor: Heinz Joseph Gerber, West Hartford, Conn.

[73] Assignee: The Gerber Scientific Instrument Company, South Windsor, Conn.

[22] Filed: Mar. 1, 1974

[21] Appl. No.: 447,350

[52] U.S. Cl. .............. 33/185 R; 33/1 M; 33/125 C; 33/174 TA; 83/409; 90/58 R; 90/91; 269/73
[51] Int. Cl.² ..................... B27G 23/00; G01B 5/00
[58] Field of Search. 33/1 M, 125 C, 125 R, 125 A, 33/189, 185, 174 TA; 90/58 R, 69, 91; 269/71, 73; 83/409, 410, 414

[56] References Cited
UNITED STATES PATENTS

| | | | |
|---|---|---|---|
| 2,034,110 | 3/1936 | Mechau | 33/1 M |
| 3,137,942 | 6/1964 | Powers et al. | 33/125 R |
| 3,600,811 | 8/1971 | Weyrauch | 33/125 R |
| 3,675,331 | 7/1972 | Ernst et al. | 33/1 M |
| 3,801,090 | 4/1974 | Gillen | 408/91 |

FOREIGN PATENTS OR APPLICATIONS

| | | | |
|---|---|---|---|
| 469,749 | 12/1926 | Germany | 33/75 |

Primary Examiner—Richard E. Aegerter
Assistant Examiner—John W. Shepperd
Attorney, Agent, or Firm—McCormick, Paulding & Huber

[57] ABSTRACT

A high precision apparatus for sensing or measuring the relative movements of a work table and a tool head employs graduated scales and encoders cooperating with the graduations on the scales. A graduated scale for measuring movement in one coordinate direction is mounted in bearings on the frame supporting the tool and work table and is urged into engagement with an optically flat surface of a reference plate extending along one edge of the work table. The encoder cooperating with the graduations on the graduated scale is fixed in a stationary fashion to the frame adjacent the graduated scale and produces a pulsed output as graduations on the scale pass by the encoder. One graduated scale and encoder is utilized for each coordinate axis in which relative movement takes place. The scales are mounted as close as possible to the work plane on the table and also are positioned as close as possible to and preferably coaxially of the coordinate axes of motion intersecting the axis of the tool.

6 Claims, 5 Drawing Figures

APPARATUS FOR SENSING RELATIVE MOVEMENT OF A WORK TABLE AND TOOL

BACKGROUND OF THE INVENTION

The present invention relates to apparatus for sensing the relative movement of the tool and work table with high precision. More particularly, the present invention relates to apparatus which measures the position of a tool relative to a work table and generates a control signal for use in a closed loop servo system which positions the tool and work table relative to one another.

In the field of numerically controlled and other automated machine tools, a position transducer of some type is utilized to provide position feedback information in a closed loop servosystem which positions a tool and workpiece on a work table relative to one another. With many machine tools, high accuracy positioning of the tool on the workpiece requires a specialized transducer such as a laser measuring system shown in U.S. Pat. Nos. 3,544,213, 3,622,244 and 3,661,464 for generating position information with accuracy in the order of 100 microinches. Optical light head plotters such as disclosed in U.S. patent application Ser. No. 395,010 filed Sept. 7, 1973, operate with this accuracy in the manufacturing of photographic master plates from which micro-miniaturized integrated circuits are developed.

While a laser measuring system is needed in some high-accuracy plotters and other machine tools, there are other tool systems in which the tolerances are larger and which, accordingly, do not require the relatively expensive laser measuring systems for closing the servo loop. In a system generating position information in the range of 0.001 inches, graduated mechanical scales and cooperating encoders of the prior art are capable of providing feedback information of the required accuracy at costs which are less than that of a laser measuring system. However, to derive maximum accuracy from a position measuring system, it is imperative to locate the sensing apparatus in strategic positions relative to the work surface of the table and the coordinate axes along which the tool and table move relative to one another.

It is, accordingly, a general object of the present invention to disclose apparatus for sensing the relative positioning of a tool and work table with high accuracy by means of mechanical scales.

SUMMARY OF THE INVENTION

The present invention resides in an apparatus for sensing or measuring the relative movement of a work table and a tool head mounted on a frame supporting the table. The tool head has a tool axis and is positioned so that the axis extends perpendicular to the work surface of the table as the table and the tool move relative to one another. In this manner the tool performs a tool operation on the workpiece at different locations on the work surface of the table.

The apparatus includes a first graduated scale extending adjacent the plane of the work surface between two reference stations associated with the tool head and the table respectively. The scale extends in a first coordinate direction defined by a coordinate axis intersecting the tool axis and parallel with the work surface of the table.

The apparatus also includes a first encoder mounted at one of the reference stations adjacent the scale and cooperating with the graduations of the scale for detecting relative movements of the scale and encoder.

Means are connected to the work table for moving the scale and encoder relative to one another in accordance with the table motions in the first coordinate direction. The relative movements of the scale and encoder correspond to the relative movements of the tool and work table so that the signals emitted by the encoder can be used as feedback information in a closed loop servosystem.

By employing a scale and encoder along each of the coordinate axes in which relative movements of the work table and tool take place, the position of the tool over a workpiece on the table may be completely defined. Inherent measurement errors generated due to thermal distortions and mechanical straining of the frame supporting the tool and work table are minimized by locating the scales as close as possible to or coaxially of coordinate axes which intersect the tool axis in the work plane.

DESCRIPTION OF THE PREFERRED EMBODIMENTS

Figure 1:
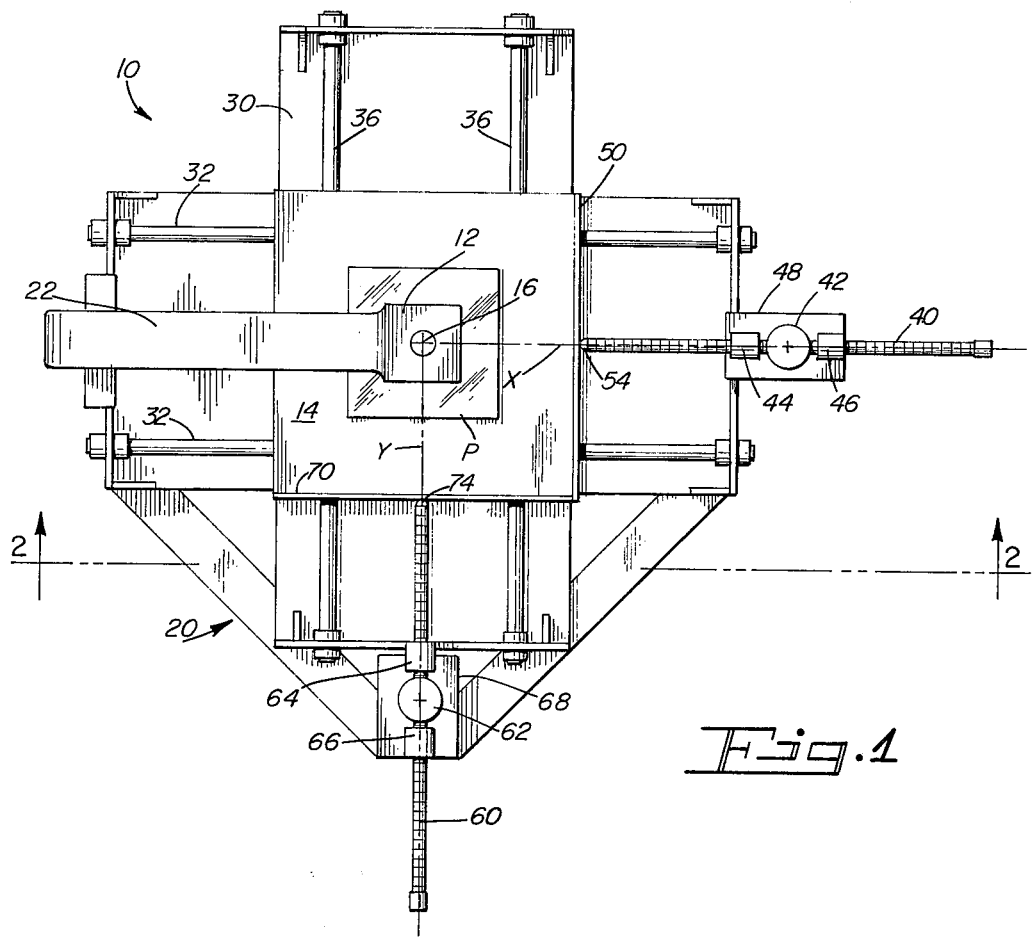
FIG. 1 is a top plan view of the high accuracy plotter employing mechanical scales in accordance with one embodiment of the present invention.
Figure 2:
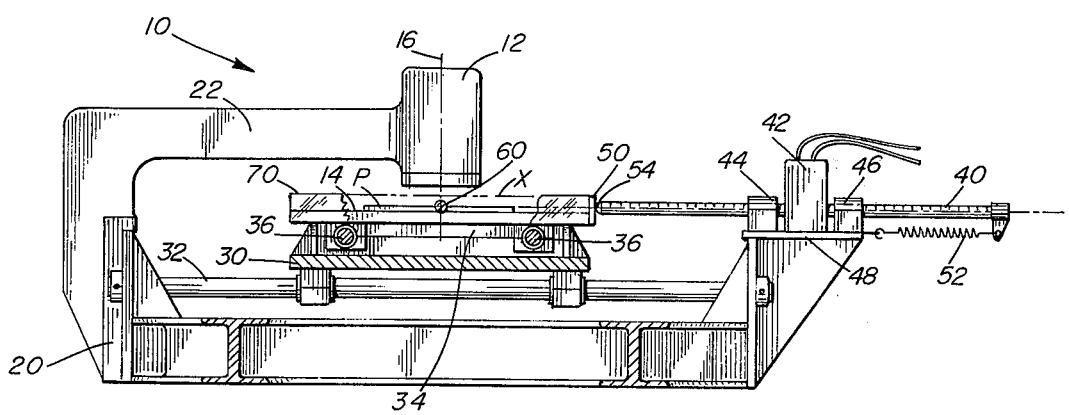
FIG. 2 is a cross sectional view of the high accuracy plotter as viewed along the sectioning line 2—2 in FIG. 1.

FIGS. 1 and 2 illustrate one embodiment of the apparatus for sensing or measuring relative movement in accordance with the present invention. The apparatus is disclosed in a numerically controlled plotter, generally designated 10, although the apparatus may be used as well in other machine tools. The plotter is a high accuracy machine having a photohead 12 which projects a fine beam of light along an optical axis 16 onto a photographic plate P positioned on the work surface of a movable work table 14. The photohead 12 is a tool within the scope of the present invention and the optical axis 16 along which the light beam from the head is projected is a tool axis which is perpendicular to the work surface of the table and the photoplate supported thereon. The work table 14 and the photoplate P move under the control of a servosystem relative to the photohead 12 in the X- and Y-coordinate directions identified by the illustrated X and Y axes to allow the light beam from the head 12 to reach any point to be exposed on the plate P. For generating high accuracy masters that are used to produce micro-miniaturized integrated circuits, for example, the photoplate P is a glass plate having a photosensitive coating defining the work plane on the upper side of the plate facing the photohead.

The plotter 10 more specifically includes a structural frame 20 from which both the photohead 12 and the work table 14 are supported. The photohead 12 is mounted from one side of the frame 20 by means of a cantilevered arm 22 which projects inwardly toward the center of the frame so that the photohead 12 is located just above the work table 14.

The work table 14 is supported for movement relative to the photohead 12 along the illustrated X- and Y-coordinate axes by a carriage system. An X-carriage 30 is mounted on a set of mechanical ways 32 extending parallel to the X-axis and fixed to the frame 20. The X-carriage 30 is moved back and forth on the ways 32 by means of a servomotor (not shown) in response to control signals generated from a program in accordance with the particular graphic to be exposed on the photoplate P.

A Y-carriage 34 is supported on the X-carriage 30 by a pair of ways 36 fixed to the X-carriage 30 parallel to the Y-axis. Movement of the Y-carriage relative to the X-carriage is produced by another servomotor (not shown) which also receives control signals in accordance with the graphic being produced on the photoplate P.

It will be understood that composite motions of the X-carriage 30 and the Y-carriage 34 permit the work table 14 to be translated in the work plane defined above the work table by the X- and Y-coordinate axes. The X- and Y-axes and the optical axis 16 of the photohead intersect in orthogonal relationship on the upper side of the photoplate P so that the work point on the plate at the intersection of the axes may effectively be moved to any point on the plate surface to thereby expose the plate in a preselected manner or pattern.

In accordance with the present invention, the measuring apparatus which provides position-feedback information for the servosystem that moves the work table 14 relative to the photohead 12 is comprised of a graduated scale 40 and an encoder 42 which cooperates with the scale to detect the graduations as the table moves in the X-coordinate direction. The scale 40 may be, for example, a glass rod having fine graduations etched in the surface of the rod and the encoder 42 may be a photodetector which detects the motions of the glass rod as the graduations pass under the aperture of the detector. The output of such an encoder is a series of pulses corresponding in number to the graduations which move under the aperture and is, accordingly, proportional to the displacement of the scale along the X-axis.

The graduated scale 40 is supported coaxially of the X-axis by means of a pair of bearings 44 and 46 mounted on a platform 48 fixed to the frame 20. The encoder 42 is mounted on the platform at a reference station on the X-axis interposed between the bearings 44 and 46 and straddles the scale 40 for reading the graduations.

Attached to the edge of the work table 14 facing the platform 48 is a reference plate 50 which bears an optically flat surface perpendicular to the X-axis and facing outwardly of the table 14 toward the platform 48. The graduated scale 40 is urged into contact with the optically flat surface on the reference plate 50 by means of a tension spring 52 so that the plate serves as the reference station defining the position of the table being measured or sensed by the scale 40. The loading applied to the scale 40 by the spring 52 must be great enough to cause the scale to accurately track the table motions at high frequencies.

A spherical bearing 54 is attached to the inwardly projecting end of the scale 40, and therefore, is interposed between the scale and the reference plate 50 to permit the work table 14 to move freely in the Y-coordinate direction without stressing or bending the scale 40. Although a spherical bearing is shown, other types of bearings such as air bearings, or no bearing at all may be utilized as long as the scale and plate can slide freely relative to one another in the Y-coordinate direction.

It should be observed that the table position relative to the frame 20 and photohead 12 is being measured directly rather than the position of one of the drive members which moves the table. Direct measurement removes errors that exist within the drive system such as curvatures in the ways 36 which locate the table in a position slightly different from that commanded by the plotting program. Also by locating the scale 40 along the X-axis which intersects the optical axis 16, position errors attributable to rotations of the work table 14 about the optical axis are minimized. Such rotations although small, occur due to uneven movement of the carriages 30 and 34 along the set of ways 32 and 36. In should also be observed that the scale 40 is positioned in the work plane of the plate P being exposed so that Abbe errors are minimized. Abbe error is generated by non-parallelism of the measuring axis and the actual plane of interest and is proportional to the separation of the measuring axis and that plane. In the present case, the upper surface of the photoplate P is the plane of interest and the measuring axis of the scale 40 coincides with the X-coordinate axis lying in the upper surface of the plate.

Another graduated scale 60 and a cooperating encoder 62 are mounted along the Y-coordinate axis to detect movements of the work table 14 in the Y-coordinate direction. The scale 60 and encoder 62 have the same construction as and function in the same manner as the scale 40 and encoder 42 respectively. The scale 60 is mounted coaxially of the Y-axis by bearings 64 and 66 at opposite sides of the encoder 62 and the bearings 64 and 66 are fixedly attached to a support platform 68 on an extension of the frame 20.

A reference plate 70 having an optically flat surface facing outwardly toward the platform 68 is fixedly mounted to one edge of the work table 14 in perpendicular relationship to the Y-axis. Like the reference plate 50, the reference plate 70 serves as a reference station defining the position of the work table 14 in the Y-direction. A biasing spring (not shown) similar to the spring 52 urges the scale 60 into abutment with the optical surface of the plate 70. A spherical bearing 74 permits the plate 70 and the scale 60 to slide freely relative to one another as the work table 14 moves in the X-coordinate direction.

From the above, it will be understood that the scales 40 and 60 and the encoders 42 and 62 develop feedback information for the X- and Y-control axes of the servosystem which positions the work table 14 in the X-Y work plane under the photohead 12. By selectively controlling the X- and Y-displacements of the table, the light beam projected along the optical axis 16 from the photohead can be directed to selected work points on the photographic plate P and can generate given patterns with high accuracy.

Figure 3:
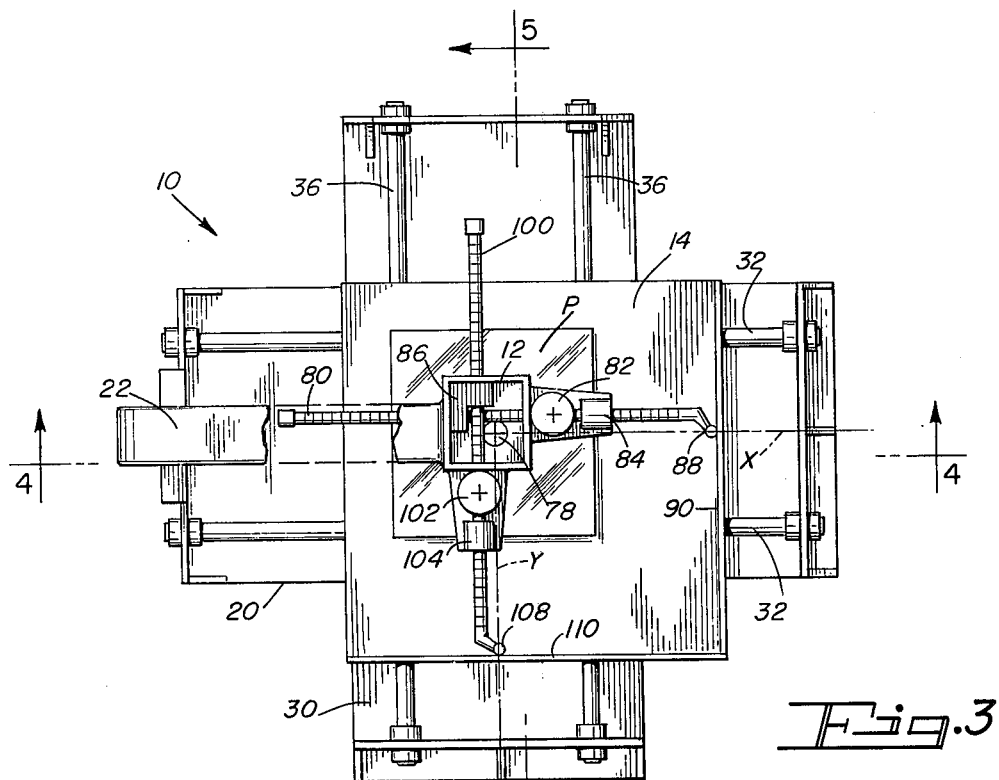
FIG. 3 is a top plan view of the high accuracy plotter employing mechanical scales in accordance with another embodiment of the present invention.
Figure 4:
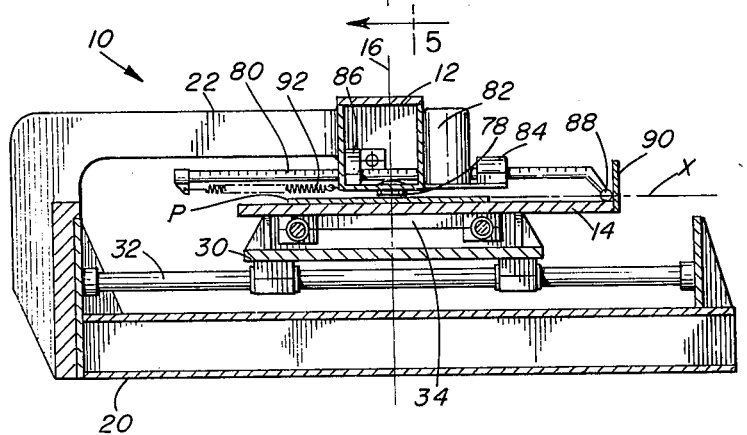
FIG. 4 is a cross sectional view of the high accuracy plotter as viewed along the sectional line 4—4 in FIG. 3.
Figure 5:
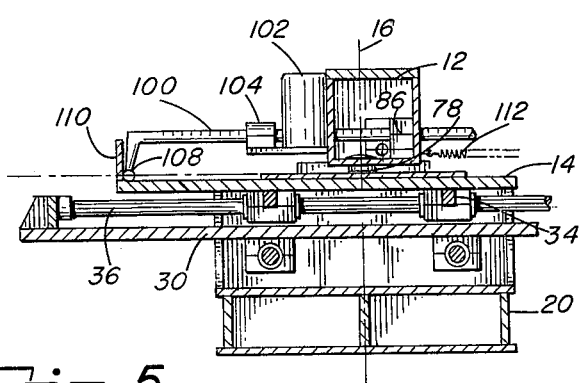
FIG. 5 is a fragmentary cross sectional view of the high accuracy plotter as viewed along the sectioning line 5—5 in FIG. 3.

FIGS. 3, 4 and 5 disclose another embodiment of the apparatus for sensing table position installed in a high accuracy plotter such as that shown in FIGS. 1 and 2. The parts of the plotter defined and described in connection with FIGS. 1 and 2 bear the same reference numerals in FIGS. 3, 4 and 5. The principal feature of the apparatus shown in FIGS. 3–5 is that it is mounted on the photohead 12 of the plotter adjacent the objective lens 78 from which the light beam of the head is directed along the optical axis 16 onto the photographic plate P.

The apparatus includes a graduated scale 80 and an encoder 82 cooperating with the graduations to detect motion of the scale relative to the photohead 12 and frame of the plotter. The scale 80 and encoder 82 have substantially the same construction as the scale 40 and encoder 42 in FIGS. 1 and 2. The encoder is mounted at a reference station within the head 12 and the scale is supported for movement relative to the head and the encoder 82 by means of a bearing 84 and a combination bearing 86 in one corner of the photohead 12. The bearings 84 and 86 support the scale 80 as close as possible to the objective lens 78 and to the X-axis extending in the plane of the photographic plate P. By necessity, the scale 80 must be offset from the X-axis which intersects the optical axis 16 and the Y-coordinate axis at the surface of the plate P but a spherical bearing 88 is mounted to the projecting end of the scale 80 in offset relationship and on the X-axis.

A reference plate 90 having an optically flat surface facing inwardly toward the photohead 12 is mounted along the one edge of the work table 14 and the scale 80 is urged against the plate by means of the tensioning spring 92 in FIG. 4. The bearing 88 interposed between the scale 80 and reference plate 90 permits the work table 14 to move relative to the scale 80 in the Y-coordinate direction while the plate 90 serves as a reference station defining the position of the work table along the X-axis. Effectively, therefore, the scale 80 and encoder 82 measure the movements of the work table and the photoplate P relative to the optical axis 16 along the X-axis by utilizing reference points that are close to or on the X-axis as, for example, the contact point between the roller bearing 88 and the reference plate 90 and Abbe errors are accordingly minimized.

In a corresponding manner, another graduated scale 100 and an encoder 102 cooperating with the scale are utilized to measure the relative movements of the work table 14 along the Y-coordinate axis. The scale 100 is located in overlying relationship with the scale 80 and is supported by means of a bearing 104 and the compound bearing 86 adjacent the objective lens 78. The scale 100 is biased into contact with a reference plate 110 fixed to an edge of the work table in perpendicular relationship to the Y-axis by means of a tensioning spring 112 connected between the scale and the housing of the photohead. A spherical bearing 108 is interposed between the scale 100 and the reference plate 110 and like bearing 88 is mounted in offset relationship to the scale 100 and on the Y-axis so that the reading from the encoder 102 represents the position of the photoplate P relative to the optical axis 16.

The advantage of the sensing or measuring apparatus illustrated in FIGS. 3–5 is that the reference stations between which the scales measure are located directly adjacent the critical components, namely, the objective lens through which the optical axis 16 extends and the edge of the work table on which the photographic plate P is mounted. Distortions of the frame 20 including the mounting arm 22 or the ways 32 and 36 on which the work table is supported do not introduce errors in the table position measurement simply because the reference stations are located directly adjacent the points of critical interest. Errors produced by uneven movement of the work table on the ways do not seriously affect the table position measurements because the measurements are taken along the X- and Y-axes and these axes intersect the optical axis in the work plane on the plate. If the scales 80 and 100 are glass scales, temperature variations have little effect upon the true reading derived from the scale due to the low coefficient of expansion of glass and to the extent that expansion is significant, it is further minimized where the photographic plate P is also a glass plate which expands in a corresponding manner.

In summary, the apparatus of the present invention utilizes graduated scales to measure the position of a work table relative to a tool head, that is, the photohead 12 in the illustrated plotter 10, and minimizes measurement errors by having the scales located either on or as close as possible to the coordinate axes along which the measurements are most important. The graduated scales are capable of high accuracy measurements almost approaching those of a laser measurement system but are far less costly.

While the present invention has been described in several preferred embodiments, it should be understood that still further substitutions and modifications can be had without departing from the present invention. The reference plates mounted on the edges of the work table and serving as abutments for the graduated scales may be constructed of metal, glass or other suitable material. The graduated scales and encoders must cooperate to produce signals indicative of table motions, and scales made of the same material as the workpiece, for example glass, can be imparted with graduations or otherwise constructed to operate with other encoders such as linear resolvers including inductive or variable reluctance encoders or holographic encoders which detect fringes at right angles to the scale. The fringes read by a holographic encoder are in effect the graduations of the scale being read. The specific bearing structures supporting the scales and interposed between the scales and reference plates can have different constructions but it is preferable that the scales not be significantly stressed by movements of the work table. The scales need not be supported within the photohead 12 as illustrated in FIGS 3–5 but may be suspended externally of the head or structure which supports the objective lens 78. Accordingly, the present invention has been described in several embodiments by way of illustration rather than limitation.

I claim:

1. In combination in a tool system having a tool head and a work table mounted on a supporting frame for movement of the table and head relative to one another, the tool head having a tool axis extending perpendicular to a work surface of the work table, the improvement comprising:

a first graduated scale extending adjacent and parallel to the work surface and through a first reference station on the tool head and to second reference station at the edge of the table, the scale also being aligned with a first coordinate direction defined by a coordinate axis intersecting the tool axis;

a bearing mounted on the tool head at the first reference station and supporting the graduated scale of movement relative to the head in the first coordinate direction;

a first encoder mounted adjacent the scale at the first reference station on the tool head and cooperating with the graduations of the scale for detecting relative movement of the scale and encoder; and means connected to the edge of the work table at the second reference station for moving the scale and the encoder relative to one another in accordance with the relative motions of the table and tool in the first coordinate direction, and said means for moving the scale includes a reference member attached to said edge of the work table and having an optically flat surface contacted by one end of said first graduated scale, the flat surface being perpendicular to and intersected by said first coordinate axis at said second reference station.

2. Apparatus for sensing relative movement as defined in claim 1 wherein the graduated scale is a glass scale.

3. Apparatus for sensing relative movement as defined in claim 1 wherein the optically flat surface on the reference member faces inwardly of the work table toward the tool axis.

4. Apparatus for sensing relative movement as defined in claim 1 further including means for urging the one end of the supported scale toward abutment with the optically flat surface of the reference member.

5. Apparatus for sensing relative movement as defined in claim 4 further including another bearing interposed between the optically flat surface of the reference member and the abutting end of the graduated scale.

6. Apparatus for sensing relative movement as defined in claim 4 wherein:

the means for urging comprises a spring.

* * * * *